US011037548B2

(12) United States Patent
Kim

(10) Patent No.: US 11,037,548 B2
(45) Date of Patent: Jun. 15, 2021

(54) DEEPLEARNING METHOD FOR VOICE RECOGNITION MODEL AND VOICE RECOGNITION DEVICE BASED ON ARTIFICIAL NEURAL NETWORK

(71) Applicant: LG ELECTRONICS INC., Seoul (KR)

(72) Inventor: Dami Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 162 days.

(21) Appl. No.: 16/567,880

(22) Filed: Sep. 11, 2019

(65) Prior Publication Data

US 2020/0005766 A1 Jan. 2, 2020

(30) Foreign Application Priority Data

Aug. 15, 2019 (KR) .......................... 10-2019-0099958

(51) Int. Cl.
  *G10L 15/06* (2013.01)
  *G10L 15/16* (2006.01)
  *G10L 15/02* (2006.01)
  *G10L 15/22* (2006.01)

(52) U.S. Cl.
  CPC ............ *G10L 15/063* (2013.01); *G10L 15/02* (2013.01); *G10L 15/16* (2013.01); *G10L 15/22* (2013.01); *G10L 2015/025* (2013.01)

(58) Field of Classification Search
  CPC ....... G10L 15/16; G10L 15/02; G10L 15/063; G10L 15/22; G10L 2015/025
  See application file for complete search history.

(56) References Cited

U.S. PATENT DOCUMENTS

| 10,127,904 B2* | 11/2018 | Rao ......................... G06N 3/084 |
| 2009/0201892 A1* | 8/2009 | Guiriec .................. G10L 19/012 370/337 |
| 2011/0055256 A1* | 3/2011 | Phillips ................... G10L 15/30 707/769 |
| 2012/0008591 A1* | 1/2012 | Miki ..................... H04L 5/0064 370/330 |
| 2012/0053933 A1* | 3/2012 | Tamura ................... G10L 13/04 704/207 |
| 2016/0260428 A1* | 9/2016 | Matsuda .................. G06N 3/08 |
| 2016/0275968 A1* | 9/2016 | Terao ...................... G10L 25/84 |
| 2019/0254013 A1* | 8/2019 | Chang ....................... H04L 5/00 |
| 2019/0266246 A1* | 8/2019 | Wang ....................... G06F 40/58 |
| 2021/0043186 A1* | 2/2021 | Nagano ................ G06F 40/284 |
| 2021/0056961 A1* | 2/2021 | Ding ....................... G10L 15/30 |

* cited by examiner

*Primary Examiner* — Michael Colucci
(74) *Attorney, Agent, or Firm* — Birch, Stewart, Kolasch & Birch, LLP

(57) ABSTRACT

A method for training an artificial neural network-based speech recognition model is disclosed. In the method for training an artificial neural network-based speech recognition model, a user's speech is learned by using target data representing features and non-target data representing non-features as random inputs and outputs, and then the user's speech is recognized under a noise situation. A method for training an artificial neural network-based speech recognition model and speech recognition device of the present disclosure can be associated with artificial intelligence modules, drones (unmanned aerial vehicles (UAVs)), robots, augmented reality (AR) devices, virtual reality (VR) devices, devices related to 5G service, etc.

16 Claims, 14 Drawing Sheets

FIG. 12

|  | Input | | | | | |
|---|---|---|---|---|---|---|
|  | Product | Echo | Noise | Distance | Speaker | Content of utterance |
| Pair1 | Studio | – | – | Close range | A | Hello |
| Pair2 | Air conditioner | 0.7 | TV | 3m | B | Nice to meet you |
| Pair3 | Cleaner | 0.3 | Music | 1m | D | Thank you |
| Pair4 | Cell phone | 0.5 | – | Close range | E | Enjoy your meal |
|  |  |  |  |  |  |  |

|  | Output | | | | | |
|---|---|---|---|---|---|---|
|  | Product | Echo | Noise | Distance | Speaker | Content of utterance |
| Pair1 | Refrigerator | 0.5 | – | 3m | A | Hello |
| Pair2 | Washing machine | 0.3 | Noise from street | 1m | C | Nice to meet you |
| Pair3 | Studio | – | – | Close range | D | Thank you |
| Pair4 | Cell phone | 0.7 | Sound of conversation | Close range | F | Enjoy your meal |
|  |  |  |  |  |  |  |

DEEPLEARNING METHOD FOR VOICE RECOGNITION MODEL AND VOICE RECOGNITION DEVICE BASED ON ARTIFICIAL NEURAL NETWORK

CROSS-REFERENCE TO RELATED APPLICATIONS

This non-provisional application claims the benefit under 35 U.S.C. § 119(a) to Korean Patent Application No. 10-2019-0099958, filed in the Republic of Korea on Aug. 15, 2019, which is hereby expressly incorporated by reference into the present application.

BACKGROUND OF THE INVENTION

Field of the Invention

The present disclosure relates to a method for training an artificial neural network-based speech recognition model, and more particularly, to a method for training a deep learning-based speech recognition model, in which a user's speech is learned by using target data representing features and non-target data representing non-features as random inputs and outputs, and then the user's speech is recognized under a noise situation.

Related Art

Speech recognition is a technology that takes a user's speech and automatically converts it into text. In recent years, speech recognition is used as an interface technology for replacing keyboard input on a smartphone or TV.

A speech recognition device is a device that recognizes speech, which is able to obtain a speech signal by recognizing an utterance received from the user and perform a predetermined task based on a result of analysis of the speech signal.

With the development of speech recognition-related technologies and home internet of things (IoT)-related technologies (e.g., 5G communication technology), a home IoT server is able to receive a speech signal, which a plurality of speech recognition devices obtain by recognizing a user's utterance (wake word), and the home IoT server is able to select and activate one of the speech recognition devices as a device that will respond to the user's utterance by analyzing the speech signal.

All of these speech recognition devices are placed in different places and their embedded microphones all differ in performance. Also, the user's utterance usually contains much noise coming from the surroundings of the speech recognition devices. Thus, due to this noise, the speech recognition devices may not be able to recognize exactly the user's utterance.

Moreover, because each speech recognition device's component for receiving the user's utterance is in a different state or each speech recognition device recognizes the user's utterance in a different way, the speech recognition devices placed in various environments cannot recognize exactly the content of the user's utterance.

SUMMARY OF THE INVENTION

An aspect of the present disclosure is to solve the above-described needs and/or problems.

An aspect of the present disclosure is to improve speech recognition rates by allowing a speech recognition device to learn a user's utterance containing noise coming from various environments around it through AI processing and recognize exactly the content of the user's utterance.

An exemplary embodiment of the present disclosure provides a method for training an artificial neural network-based speech recognition model, the method comprising: retrieving first and second speech data sets from a first database; feeding the first and second speech data sets as input and output, respectively, into a first learning model; deriving an intermediate output through first learning of the first and second data sets using the first learning model; retrieving a third speech data set, a target label containing alphabetical information about the third speech data set, and a phoneme set list from a second database; feeding the intermediate output, third speech data, target label, and phoneme set list as input and output into a second learning model; and deriving a final output through second learning of the intermediate output, third speech data set, target label, and phoneme set list using the second learning model, wherein the first and second speech data sets may be each composed of an utterance having the same meaning and phonemes and have different noise values.

Data constituting each noise value may comprise non-target data representing information on the speaker, type of speech recognition device, distance between the speech recognition device and the speaker, echo, and sounds coming from around the speech recognition device, wherein values constituting the non-target data may be randomly determined.

The method may further comprise: converting the final output into text; and outputting the text.

The method may further comprise: feeding the text into a decoder; deriving data decoded by the decoder; and measuring word error rate by evaluating the decoded data.

The method may further comprise: determining the number of learning layers used for the first learning model according to the word error rate for the text derived in the measuring of word error rate.

The method may further comprise: feeding a fourth data set into a speech recognition device; and feeding the fourth speech data set as input and the final output, target label, and phenome set list as output into a speech recognition model.

The method may further comprise: converting a speech recognition result into text, the speech recognition result being produced through learning of the fourth speech data set, final output, target label, and phoneme set list using the speech recognition model; and outputting the text.

The method may further comprise: obtaining information related to a text recognition situation through the speech recognition device, the information being derived in the conversion of a speech recognition result into text; applying the information related to the text recognition situation to a trained threshold situation determination and classification model; and determining whether the speech recognition device has recognized the text in a threshold situation or not, based on a result of applying the information related to the text recognition situation to the threshold situation determination and classification model.

The method may further comprise, if it is determined that the speech recognition device has recognized the text in a threshold situation, controlling the speech recognition device to execute a function corresponding to the text.

The information related to the text recognition situation may comprise the text recognition time, information about the user who is identified as having uttered the text, location information of the speech recognition device, surrounding acoustic information of the speech recognition device, and the position where the text is uttered, wherein the surrounding acoustic information is information about sounds other than the speech uttered by the user.

The method may further comprise: if the threshold situation determination and classification model is stored in an external AI (artificial intelligence) device, transmitting, to the external AI device, feature values for the information related to the text recognition situation; feeding the information related to the text recognition situation into the external AI device; and obtaining, from the external AI device, a result of applying the information related to the text recognition situation to the threshold situation determination and classification model.

The method may further comprise: if the threshold situation determination and classification model is stored in a network, transmitting the information related to the text recognition situation to the network; and obtaining, from the network, a result of applying the information related to the text recognition situation to the threshold situation determination and classification model.

The transmitting of the information related to the text recognition situation to the network may comprise receiving, from the network, DCI (downlink control information) used to schedule the transmission of the information related to the text recognition situation, wherein the information related to the text recognition situation may be transmitted to the network based on the DCI.

The receiving of DCI used to schedule the transmission of the information related to the text recognition situation from the network may comprise performing an initial access procedure with the network based on an SSB (synchronization signal block), wherein the information related to the text recognition information may be transmitted to the network via a PUSCH, and the SSB and the DM-RS of the PUSCH are quasi co-located with QCL type D.

Another exemplary embodiment of the present disclosure provides a speech recognition device for training an artificial neural network-based speech recognition model, the speech recognition device comprising: a speech data collector that collects speech data including the user's utterance information and acoustic data from the surroundings of the speech recognition device; an AI processor that learns the speech and acoustic data collected by the speech data collector, extracts the speech data, and converts the speech data into text; and a communication part that communicates with a network, wherein the AI processor may retrieve first and second speech data sets from a first database and retrieves a third speech data set, a target label containing alphabetical information about the third speech data set, and a phoneme set list from a second database, perform first learning through a first learning model by using the first and second speech data sets as input and output, respectively, perform second learning through a second learning model by using an intermediate output derived through the first learning, the third speech data set, the target label, and the phoneme set list as input and output, and convert a final output derived through the second learning into text and output the same, wherein the first and second data sets may be each composed of an utterance having the same meaning and phonemes and have different noise values.

In a method for training an artificial neural network-based speech recognition model according to the present disclosure, the speech recognition model is trained to recognize exactly a user's speech from speech data containing noise through AI processing. Therefore, a speech recognition device including a speech recognition model according to the present disclosure is able to recognize exactly the user's speech.

BRIEF DESCRIPTION OF THE DRAWINGS

FIG. 12 is a table showing how first and second data sets having different noise values are constructed.

DESCRIPTION OF EXEMPLARY EMBODIMENTS

Figure 1:
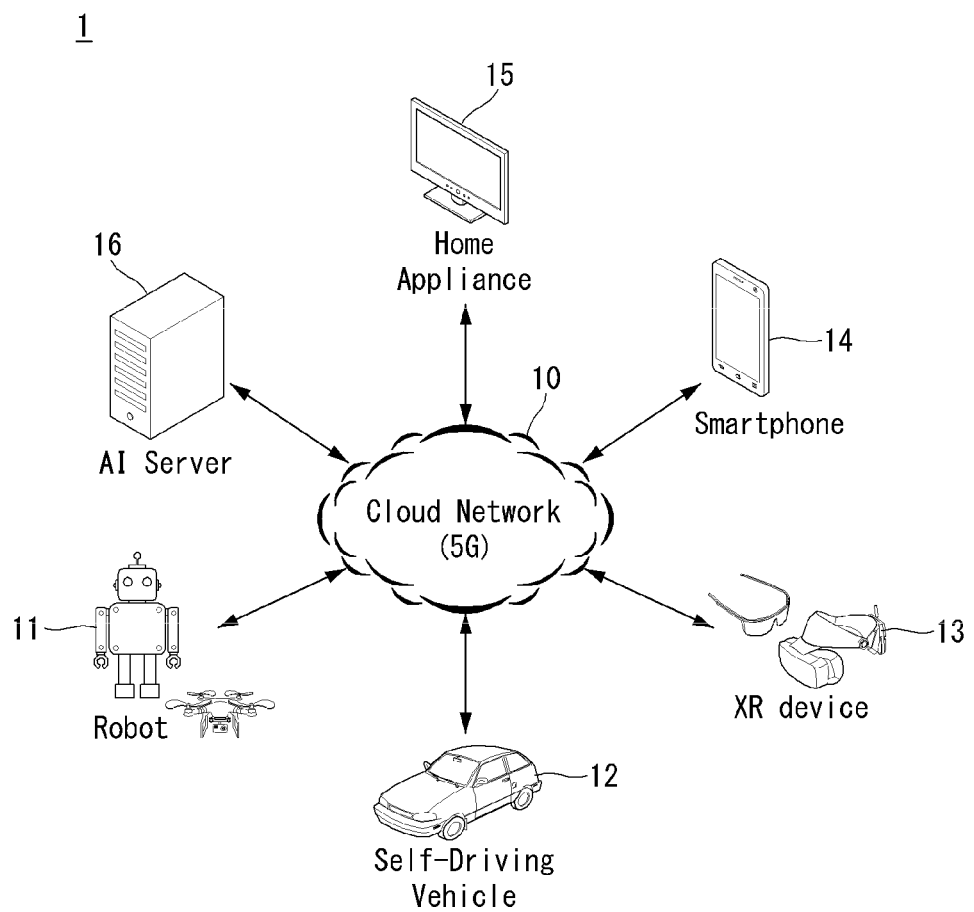
FIG. 1 illustrates one embodiment of an AI system.

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

[5G Scenario]

The three main requirement areas in the 5G system are (1) enhanced Mobile Broadband (eMBB) area, (2) massive Machine Type Communication (mMTC) area, and (3) Ultra-Reliable and Low Latency Communication (URLLC) area.

Some use case may require a plurality of areas for optimization, but other use case may focus only one Key Performance Indicator (KPI). The 5G system supports various use cases in a flexible and reliable manner.

eMBB far surpasses the basic mobile Internet access, supports various interactive works, and covers media and entertainment applications in the cloud computing or augmented reality environment. Data is one of core driving elements of the 5G system, which is so abundant that for the first time, the voice-only service may be disappeared. In the 5G, voice is expected to be handled simply by an application program using a data connection provided by the communication system. Primary causes of increased volume of traffic are increase of content size and increase of the number of applications requiring a high data transfer rate. Streaming service (audio and video), interactive video, and mobile Internet connection will be more heavily used as more and more devices are connected to the Internet. These application programs require always-on connectivity to push real-time information and notifications to the user. Cloud-based storage and applications are growing rapidly in the mobile communication platforms, which may be applied to both of business and entertainment uses. And the cloud-based storage is a special use case that drives growth of uplink data transfer rate. The 5G is also used for cloud-based remote works and requires a much shorter end-to-end latency to ensure excellent user experience when a tactile interface is used. Entertainment, for example, cloud-based game and video streaming, is another core element that strengthens the requirement for mobile broadband capability. Entertainment is essential for smartphones and tablets in any place including a high mobility environment such as a train, car, and plane. Another use case is augmented reality for entertainment and information search. Here, augmented reality requires very low latency and instantaneous data transfer.

Also, one of highly expected 5G use cases is the function that connects embedded sensors seamlessly in every possible area, namely the use case based on mMTC. Up to 2020, the number of potential IoT devices is expected to reach 20.4 billion. Industrial IoT is one of key areas where the 5G performs a primary role to maintain infrastructure for smart city, asset tracking, smart utility, agriculture and security.

URLLC includes new services which may transform industry through ultra-reliable/ultra-low latency links, such as remote control of major infrastructure and self-driving cars. The level of reliability and latency are essential for smart grid control, industry automation, robotics, and drone control and coordination.

Next, a plurality of use cases will be described in more detail.

The 5G may complement Fiber-To-The-Home (FTTH) and cable-based broadband (or DOCSIS) as a means to provide a stream estimated to occupy hundreds of megabits per second up to gigabits per second. This fast speed is required not only for virtual reality and augmented reality but also for transferring video with a resolution more than 4K (6K, 8K or more). VR and AR applications almost always include immersive sports games. Specific application programs may require a special network configuration. For example, in the case of VR game, to minimize latency, game service providers may have to integrate a core server with the edge network service of the network operator.

Automobiles are expected to be a new important driving force for the 5G system together with various use cases of mobile communication for vehicles. For example, entertainment for passengers requires high capacity and high mobile broadband at the same time. This is so because users continue to expect a high-quality connection irrespective of their location and moving speed. Another use case in the automotive field is an augmented reality dashboard. The augmented reality dashboard overlays information, which is a perception result of an object in the dark and contains distance to the object and object motion, on what is seen through the front window. In a future, a wireless module enables communication among vehicles, information exchange between a vehicle and supporting infrastructure, and information exchange among a vehicle and other connected devices (for example, devices carried by a pedestrian). A safety system guides alternative courses of driving so that a driver may drive his or her vehicle more safely and to reduce the risk of accident. The next step will be a remotely driven or self-driven vehicle. This step requires highly reliable and highly fast communication between different self-driving vehicles and between a self-driving vehicle and infrastructure. In the future, it is expected that a self-driving vehicle takes care of all of the driving activities while a human driver focuses on dealing with an abnormal driving situation that the self-driving vehicle is unable to recognize. Technical requirements of a self-driving vehicle demand ultra-low latency and ultra-fast reliability up to the level that traffic safety may not be reached by human drivers.

The smart city and smart home, which are regarded as essential to realize a smart society, will be embedded into a high-density wireless sensor network. Distributed networks comprising intelligent sensors may identify conditions for cost-efficient and energy-efficient conditions for maintaining cities and homes. A similar configuration may be applied for each home. Temperature sensors, window and heating controllers, anti-theft alarm devices, and home appliances will be all connected wirelessly. Many of these sensors typified with a low data transfer rate, low power, and low cost. However, for example, real-time HD video may require specific types of devices for the purpose of surveillance.

As consumption and distribution of energy including heat or gas is being highly distributed, automated control of a distributed sensor network is required. A smart grid collects information and interconnect sensors by using digital information and communication technologies so that the distributed sensor network operates according to the collected information. Since the information may include behaviors of energy suppliers and consumers, the smart grid may help improving distribution of fuels such as electricity in terms of efficiency, reliability, economics, production sustainability, and automation. The smart grid may be regarded as a different type of sensor network with a low latency.

The health-care sector has many application programs that may benefit from mobile communication. A communication system may support telemedicine providing a clinical care from a distance. Telemedicine may help reduce barriers to distance and improve access to medical services that are not readily available in remote rural areas. It may also be used to save lives in critical medical and emergency situations. A wireless sensor network based on mobile communication may provide remote monitoring and sensors for parameters such as the heart rate and blood pressure.

Wireless and mobile communication are becoming increasingly important for industrial applications. Cable wiring requires high installation and maintenance costs. Therefore, replacement of cables with reconfigurable wireless links is an attractive opportunity for many industrial applications. However, to exploit the opportunity, the wireless connection is required to function with a latency similar to that in the cable connection, to be reliable and of large capacity, and to be managed in a simple manner. Low latency and very low error probability are new requirements that lead to the introduction of the 5G system.

Logistics and freight tracking are important use cases of mobile communication, which require tracking of an inventory and packages from any place by using location-based information system. The use of logistics and freight tracking typically requires a low data rate but requires large-scale and reliable location information.

The present disclosure to be described below may be implemented by combining or modifying the respective embodiments to satisfy the aforementioned requirements of the 5G system.

FIG. 1 illustrates one embodiment of an AI system.

Referring to FIG. 1, in the AI system, at least one or more of an AI server 16, robot 11, self-driving vehicle 12, XR device 13, smartphone 14, or home appliance 15 are connected to a cloud network 10. Here, the robot 11, self-driving vehicle 12, XR device 13, smartphone 14, or home appliance 15 to which the AI technology has been applied may be referred to as an AI device (11 to 15).

The cloud network 10 may comprise part of the cloud computing infrastructure or refer to a network existing in the cloud computing infrastructure. Here, the cloud network 10 may be constructed by using the 3G network, 4G or Long Term Evolution (LTE) network, or 5G network.

In other words, individual devices (11 to 16) constituting the AI system may be connected to each other through the cloud network 10. In particular, each individual device (11 to 16) may communicate with each other through the eNB but may communicate directly to each other without relying on the eNB.

The AI server 16 may include a server performing AI processing and a server performing computations on big data.

The AI server 16 may be connected to at least one or more of the robot 11, self-driving vehicle 12, XR device 13, smartphone 14, or home appliance 15, which are AI devices constituting the AI system, through the cloud network 10 and may help at least part of AI processing conducted in the connected AI devices (11 to 15).

At this time, the AI server 16 may teach the artificial neural network according to a machine learning algorithm on behalf of the AI device (11 to 15), directly store the learning model, or transmit the learning model to the AI device (11 to 15).

At this time, the AI server 16 may receive input data from the AI device (11 to 15), infer a result value from the received input data by using the learning model, generate a response or control command based on the inferred result value, and transmit the generated response or control command to the AI device (11 to 15).

Similarly, the AI device (11 to 15) may infer a result value from the input data by employing the learning model directly and generate a response or control command based on the inferred result value.

<AI+Robot>

By employing the AI technology, the robot 11 may be implemented as a guide robot, transport robot, cleaning robot, wearable robot, entertainment robot, pet robot, or unmanned flying robot.

The robot 11 may include a robot control module for controlling its motion, where the robot control module may correspond to a software module or a chip which implements the software module in the form of a hardware device.

The robot 11 may obtain status information of the robot 11, detect (recognize) the surroundings and objects, generate map data, determine a travel path and navigation plan, determine a response to user interaction, or determine motion by using sensor information obtained from various types of sensors.

Here, the robot 11 may use sensor information obtained from at least one or more sensors among lidar, radar, and camera to determine a travel path and navigation plan.

The robot 11 may perform the operations above by using a learning model built on at least one or more artificial neural networks. For example, the robot 11 may recognize the surroundings and objects by using the learning model and determine its motion by using the recognized surroundings or object information. Here, the learning model may be the one trained by the robot 11 itself or trained by an external device such as the AI server 16.

At this time, the robot 11 may perform the operation by generating a result by employing the learning model directly but also perform the operation by transmitting sensor information to an external device such as the AI server 16 and receiving a result generated accordingly.

The robot 11 may determine a travel path and navigation plan by using at least one or more of object information detected from the map data and sensor information or object information obtained from an external device and navigate according to the determined travel path and navigation plan by controlling its locomotion platform.

Map data may include object identification information about various objects disposed in the space in which the robot 11 navigates. For example, the map data may include object identification information about static objects such as wall and doors and movable objects such as a flowerpot and a desk. And the object identification information may include the name, type, distance, location, and so on.

Also, the robot 11 may perform the operation or navigate the space by controlling its locomotion platform based on the control/interaction of the user. At this time, the robot 11 may obtain intention information of the interaction due to the user's motion or voice command and perform an operation by determining a response based on the obtained intention information.

<AI+Autonomous Navigation>

By employing the AI technology, the self-driving vehicle 12 may be implemented as a mobile robot, unmanned ground vehicle, or unmanned aerial vehicle.

The self-driving vehicle 12 may include an autonomous navigation module for controlling its autonomous navigation function, where the autonomous navigation control module may correspond to a software module or a chip which implements the software module in the form of a hardware device. The autonomous navigation control module may be installed inside the self-driving vehicle 12 as a constituting element thereof or may be installed outside the self-driving vehicle 12 as a separate hardware component.

The self-driving vehicle 12 may obtain status information of the self-driving vehicle 12, detect (recognize) the surroundings and objects, generate map data, determine a travel path and navigation plan, or determine motion by using sensor information obtained from various types of sensors.

Like the robot 11, the self-driving vehicle 12 may use sensor information obtained from at least one or more sensors among lidar, radar, and camera to determine a travel path and navigation plan.

In particular, the self-driving vehicle 12 may recognize an occluded area or an area extending over a predetermined distance or objects located across the area by collecting sensor information from external devices or receive recognized information directly from the external devices.

The self-driving vehicle 12 may perform the operations above by using a learning model built on at least one or more artificial neural networks. For example, the self-driving vehicle 12 may recognize the surroundings and objects by using the learning model and determine its navigation route by using the recognized surroundings or object information. Here, the learning model may be the one trained by the self-driving vehicle 12 itself or trained by an external device such as the AI server 16.

At this time, the self-driving vehicle 12 may perform the operation by generating a result by employing the learning model directly but also perform the operation by transmitting sensor information to an external device such as the AI server 16 and receiving a result generated accordingly.

The self-driving vehicle 12 may determine a travel path and navigation plan by using at least one or more of object information detected from the map data and sensor information or object information obtained from an external device and navigate according to the determined travel path and navigation plan by controlling its driving platform.

Map data may include object identification information about various objects disposed in the space (for example, road) in which the self-driving vehicle 12 navigates. For example, the map data may include object identification information about static objects such as streetlights, rocks and buildings and movable objects such as vehicles and pedestrians. And the object identification information may include the name, type, distance, location, and so on.

Also, the self-driving vehicle 12 may perform the operation or navigate the space by controlling its driving platform based on the control/interaction of the user. At this time, the self-driving vehicle 12 may obtain intention information of the interaction due to the user's motion or voice command and perform an operation by determining a response based on the obtained intention information.

<AI+XR>

By employing the AI technology, the XR device 13 may be implemented as a Head-Mounted Display (HMD), Head-Up Display (HUD) installed at the vehicle, TV, mobile phone, smartphone, computer, wearable device, home appliance, digital signage, vehicle, robot with a fixed platform, or mobile robot.

The XR device 13 may obtain information about the surroundings or physical objects by generating position and attribute data about 3D points by analyzing 3D point cloud or image data acquired from various sensors or external devices and output objects in the form of XR objects by rendering the objects for display.

The XR device 13 may perform the operations above by using a learning model built on at least one or more artificial neural networks. For example, the XR device 13 may recognize physical objects from 3D point cloud or image data by using the learning model and provide information corresponding to the recognized physical objects. Here, the learning model may be the one trained by the XR device 13 itself or trained by an external device such as the AI server 16.

At this time, the XR device 13 may perform the operation by generating a result by employing the learning model directly but also perform the operation by transmitting sensor information to an external device such as the AI server 16 and receiving a result generated accordingly.

<AI+Robot+Autonomous Navigation>

By employing the AI and autonomous navigation technologies, the robot 11 may be implemented as a guide robot, transport robot, cleaning robot, wearable robot, entertainment robot, pet robot, or unmanned flying robot.

The robot 11 employing the AI and autonomous navigation technologies may correspond to a robot itself having an autonomous navigation function or a robot 11 interacting with the self-driving vehicle 12.

The robot 11 having the autonomous navigation function may correspond collectively to the devices which may move autonomously along a given path without control of the user or which may move by determining its path autonomously.

The robot 11 and the self-driving vehicle 12 having the autonomous navigation function may use a common sensing method to determine one or more of the travel path or navigation plan. For example, the robot 11 and the self-driving vehicle 12 having the autonomous navigation function may determine one or more of the travel path or navigation plan by using the information sensed through lidar, radar, and camera.

The robot 11 interacting with the self-driving vehicle 12, which exists separately from the self-driving vehicle 12, may be associated with the autonomous navigation function inside or outside the self-driving vehicle 12 or perform an operation associated with the user riding the self-driving vehicle 12.

At this time, the robot 11 interacting with the self-driving vehicle 12 may obtain sensor information in place of the self-driving vehicle 12 and provide the sensed information to the self-driving vehicle 12; or may control or assist the autonomous navigation function of the self-driving vehicle 12 by obtaining sensor information, generating information of the surroundings or object information, and providing the generated information to the self-driving vehicle 12.

Also, the robot 11 interacting with the self-driving vehicle 12 may control the function of the self-driving vehicle 12 by monitoring the user riding the self-driving vehicle 12 or through interaction with the user. For example, if it is determined that the driver is drowsy, the robot 11 may activate the autonomous navigation function of the self-driving vehicle 12 or assist the control of the driving platform of the self-driving vehicle 12. Here, the function of the self-driving vehicle 12 controlled by the robot 12 may include not only the autonomous navigation function but also the navigation system installed inside the self-driving vehicle 12 or the function provided by the audio system of the self-driving vehicle 12.

Also, the robot 11 interacting with the self-driving vehicle 12 may provide information to the self-driving vehicle 12 or assist functions of the self-driving vehicle 12 from the outside of the self-driving vehicle 12. For example, the robot 11 may provide traffic information including traffic sign information to the self-driving vehicle 12 like a smart traffic light or may automatically connect an electric charger to the charging port by interacting with the self-driving vehicle 12 like an automatic electric charger of the electric vehicle.

<AI+Robot+XR>

By employing the AI technology, the robot 11 may be implemented as a guide robot, transport robot, cleaning robot, wearable robot, entertainment robot, pet robot, or unmanned flying robot.

The robot 11 employing the XR technology may correspond to a robot which acts as a control/interaction target in the XR image. In this case, the robot 11 may be distinguished from the XR device 13, both of which may operate in conjunction with each other.

If the robot 11, which acts as a control/interaction target in the XR image, obtains sensor information from the sensors including a camera, the robot 11 or XR device 13 may generate an XR image based on the sensor information, and the XR device 13 may output the generated XR image. And the robot 11 may operate based on the control signal received through the XR device 13 or based on the interaction with the user.

For example, the user may check the XR image corresponding to the viewpoint of the robot 11 associated remotely through an external device such as the XR device 13, modify the navigation path of the robot 11 through interaction, control the operation or navigation of the robot 11, or check the information of nearby objects.

<AI+Autonomous Navigation+XR>

By employing the AI and XR technologies, the self-driving vehicle 12 may be implemented as a mobile robot, unmanned ground vehicle, or unmanned aerial vehicle.

The self-driving vehicle 12 employing the XR technology may correspond to a self-driving vehicle having a means for providing XR images or a self-driving vehicle which acts as a control/interaction target in the XR image. In particular, the self-driving vehicle 12 which acts as a control/interaction target in the XR image may be distinguished from the XR device 13, both of which may operate in conjunction with each other.

The self-driving vehicle 12 having a means for providing XR images may obtain sensor information from sensors including a camera and output XR images generated based on the sensor information obtained. For example, by displaying an XR image through HUD, the self-driving vehicle 12 may provide XR images corresponding to physical objects or image objects to the passenger.

At this time, if an XR object is output on the HUD, at least part of the XR object may be output so as to be overlapped with the physical object at which the passenger gazes. On the other hand, if an XR object is output on a display installed inside the self-driving vehicle 12, at least part of the XR object may be output so as to be overlapped with an image object. For example, the self-driving vehicle 12 may output XR objects corresponding to the objects such as roads, other vehicles, traffic lights, traffic signs, bicycles, pedestrians, and buildings.

If the self-driving vehicle 12, which acts as a control/interaction target in the XR image, obtains sensor information from the sensors including a camera, the self-driving vehicle 12 or XR device 13 may generate an XR image based on the sensor information, and the XR device 13 may output the generated XR image. And the self-driving vehicle 12 may operate based on the control signal received through an external device such as the XR device 13 or based on the interaction with the user.

[Extended Reality Technology]

eXtended Reality (XR) refers to all of Virtual Reality (VR), Augmented Reality (AR), and Mixed Reality (MR). The VR technology provides objects or backgrounds of the real world only in the form of CG images, AR technology provides virtual CG images overlaid on the physical object images, and MR technology employs computer graphics technology to mix and merge virtual objects with the real world.

MR technology is similar to AR technology in a sense that physical objects are displayed together with virtual objects. However, while virtual objects supplement physical objects in the AR, virtual and physical objects co-exist as equivalents in the MR.

The XR technology may be applied to Head-Mounted Display (HMD), Head-Up Display (HUD), mobile phone, tablet PC, laptop computer, desktop computer, TV, digital signage, and so on, where a device employing the XR technology may be called an XR device.

A. Example of Block Diagram of UE and 5G Network

Figure 2:
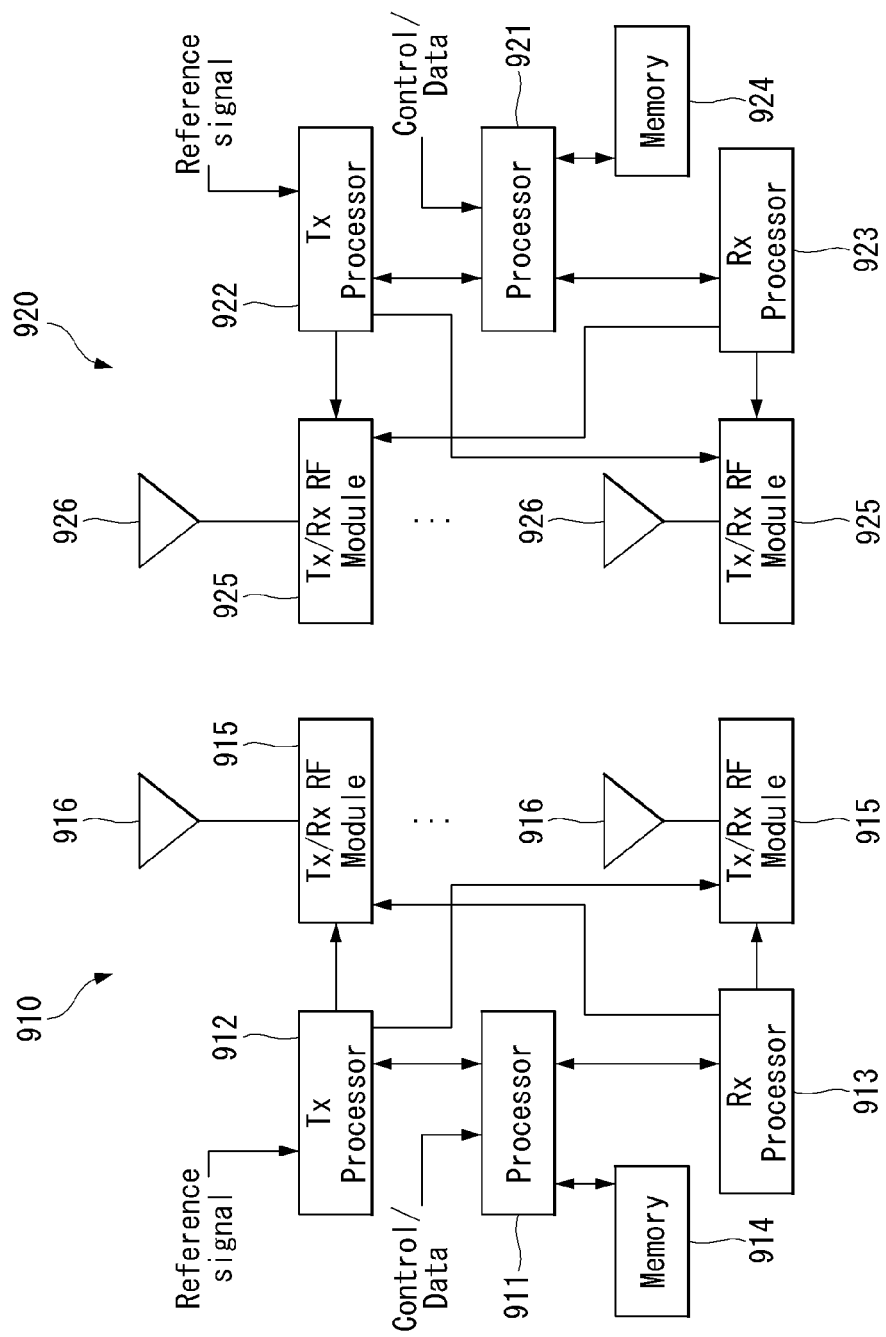
FIG. 2 is a block diagram of a wireless communication system to which methods proposed in the disclosure are applicable.

FIG. 2 is a block diagram of a wireless communication system to which methods proposed in the disclosure are applicable.

Referring to FIG. 2, a device (AI device) including an AI module is defined as a first communication device (910 of FIG. 2), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 2, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 3:
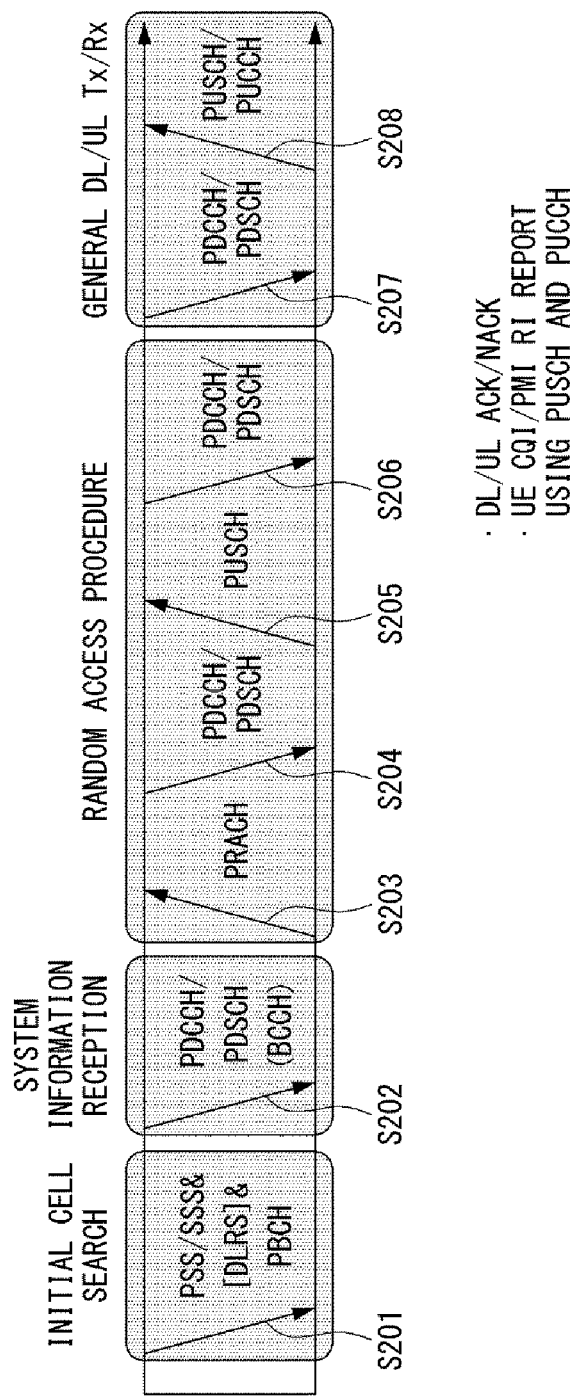
FIG. 3 shows an example of a signal transmission/reception method in a wireless communication system.

FIG. 3 is a diagram showing an example of a signal transmission/reception method in a wireless communication system.

Referring to FIG. 3, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 3.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 3.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof.
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

- A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.
- The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.
- When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Processing Using 5G Communication

Figure 4:
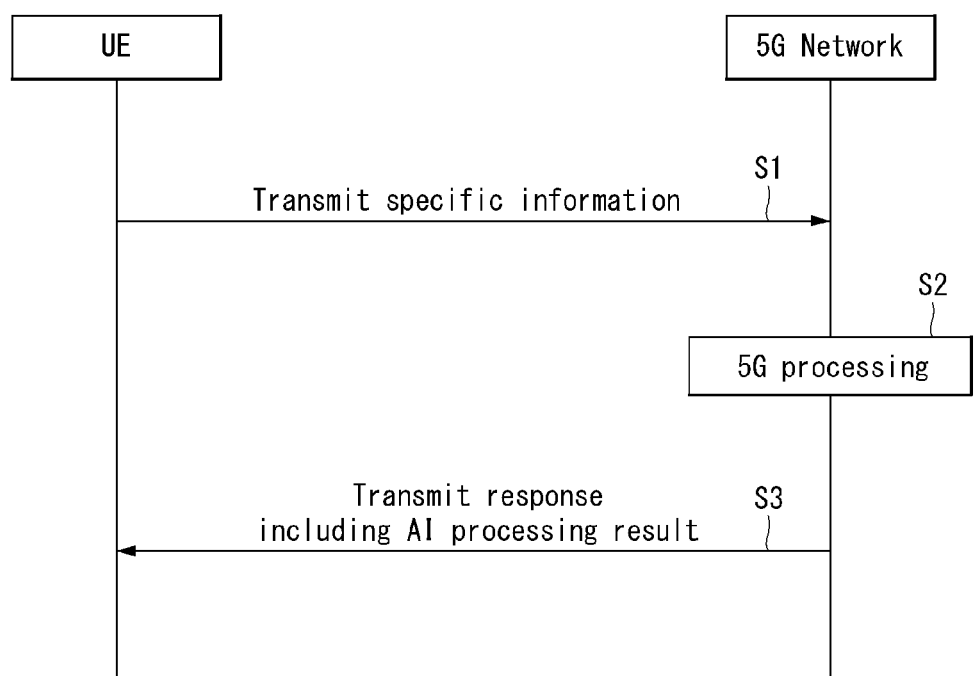
FIG. 4 shows an example of basic operations of an user equipment and a 5G network in a 5G communication system.

FIG. 4 shows an example of basic operations of AI processing in a 5G communication system.

The UE transmits specific information to the 5G network (S1). The 5G network may perform 5G processing related to the specific information (S2). Here, the 5G processing may include AI processing. And the 5G network may transmit response including AI processing result to UE(S3).

G. Applied Operations Between UE and 5G Network in 5G Communication System

Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 4, the autonomous vehicle performs an initial access procedure and a random access procedure with the 5G network prior to step S1 of FIG. 4 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

In the specification below, a user's utterance may be defined as language, speech, or sounds the user speaks orally in order to interact with a specific speech recognition device.

Figure 5:
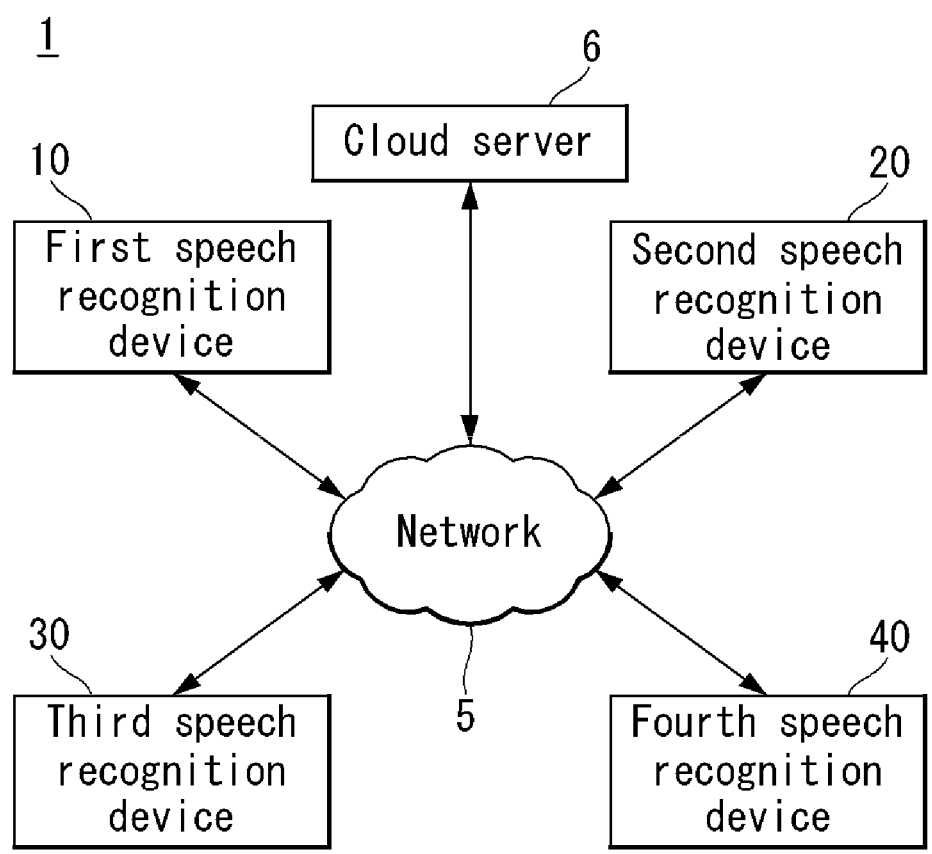
FIG. 5 is a schematic block diagram of a speech recognition system including speech recognition devices according to an exemplary embodiment of the present disclosure.

FIG. 5 is a schematic block diagram of a speech recognition system including speech recognition devices according to an exemplary embodiment of the present disclosure.

Referring to FIG. 5, a speech recognition system 1 including a speech recognition device according to the present disclosure may include a plurality of speech recognition devices 10, 20, 30, and 40 placed in specific environments such as home, factory, office, or forest.

Each of the devices 10, 20, 30, and 40 includes a communication unit 53, 77, 6 and 7 capable of communicating with the network 5, and may be connected to each other through the network 5.

The devices 10, 20, 30, and 40 may be home appliances, such as a refrigerator, TV, smartphone, audio device, computer, washing machine, electric oven, illuminating lamp, air conditioner, or vehicle, that are connected together via a wireless communication interface.

An example of the wireless communication interface may include the internet of things (IoT). Another example of the wireless communication interface may include cellular communication using at least one among LTE (Long Term Evolution), LTE-A (LTE Advance), CDMA (code division multiple access), WCDMA (wideband CDMA), UMTS (universal mobile telecommunications system), WiBro (Wireless Broadband), and GSM (Global System for Mobile Communications). A further example of the wireless communication interface may include at least one among WiFi (wireless fidelity), Bluetooth, Bluetooth low power (BLE), Zigbee, NFC (near field communication), Magnetic Secure Transmission, radio frequency (RF), and body area network (BAN).

The devices 10, 20, 30, and 40 may be connected to a cloud server 6 over the network 5 shown in FIG. 5. In this case, voice commands from the user may be processed through a speech recognition module in the cloud server 6.

However, the cloud server 6 shown in FIG. 5 is only an exemplary component included in the speech recognition system 1 including a speech recognition device according to the present disclosure, so the devices 10, 20, 30, and 40 may not be connected to the cloud server 6 over the network 5. In this case, any one of the devices 10, 20, 30, and 40 may serve as a master device that deals with voice command-related signal processing and response control, and the other devices may serve as slave devices controlled by the master device. The user's speech commands may be processed through a speech recognition module embedded in the master device.

Figure 6:
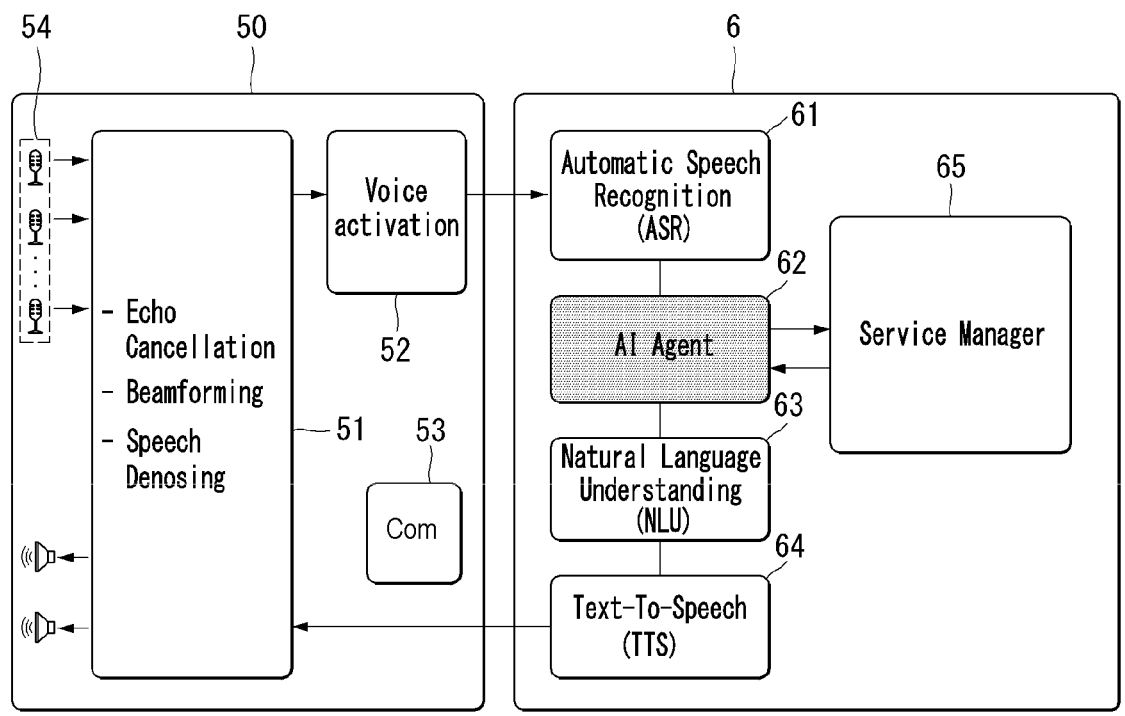
FIGS. 6 and 7 are a voice processing process performed in a device environment and/or a cloud environment or a server environment.

Hereinafter, a speech processing procedure performed by a device environment and/or a cloud environment or server environment will be described with reference to FIGS. 6 and 7. FIG. 6 shows an example in which, while a speech can be received in a device 50, a procedure of processing the received speech and thereby synthesize the speech, that is, overall operations of speech synthesis, is performed in a cloud environment 60. On the contrary, FIG. 7 shows an example of on-device processing indicating that a device 70 performs the aforementioned overall operations of speech synthesis by processing a received speech and thereby synthesizing the speech.

Figure 7:
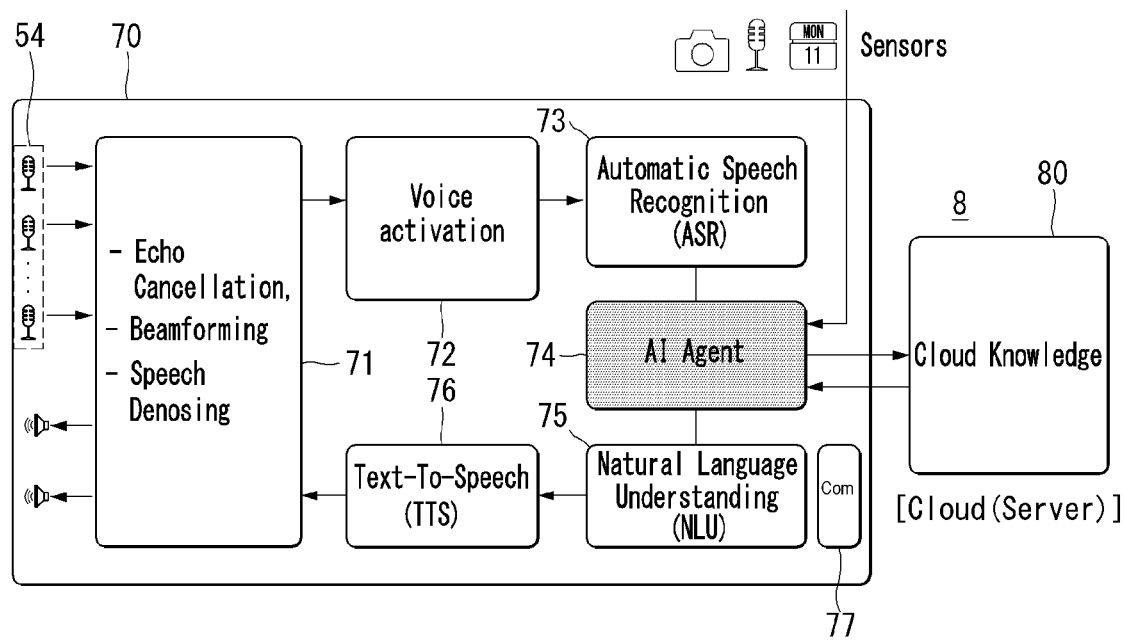

In FIGS. 6 and 7, the device environments 50, 70 may be referred to as client devices, and the cloud environments 6 and 8 may be referred to as servers.

FIG. 6 shows a schematic block diagram of a text-to-speech (TTS) device in a TTS system according to an embodiment of the present disclosure.

In order to process a speech event in an end-to-end speech UI environment, various configurations are required. A sequence for processing the speech event performs signal acquisition playback, speech pre-processing, voice activation, speech recognition, natural language processing, and speech synthesis by which a device responds to a user.

The client device 50,70 may include an input module. The input module may receive a user input from a user. For example, the input module may receive the user input from an external device (e.g., a keyboard and a headset) connected thereto. In addition, for example, the input module may include a touch screen. In addition, for example, the input module may include a hardware key located in a user terminal.

The input module of the client device 50 and 70 according to the exemplary embodiment of the present disclosure may include at least one microphone capable of receiving a user's utterance as a speech signal. The input module may include a speech input system, and is able to receive the user's utterance as a speech signal through the speech input system. The at least one microphone may determine a digital input signal for the user's utterance by generating an input signal for audio input. According to the present disclosure, such a microphone serves as a speech data collector 54 that collects speech data including a user's utterance information and acoustic data from the surroundings of the speech recognition device.

Moreover, the client device 50 and 70 according to the exemplary embodiment of the present disclosure may include a microphone array, i.e., an array of microphones, which is an implementation of the speech data collector 54. The array may be arranged in a geometric pattern, for example, a linear geometric pattern, circular geometric pattern, or any other configuration. For example, a microphone array of four sensors may be placed in a circular pattern relative to a given point, divided by 90 degrees to receive sounds from four directions. Also, the microphones include spatially different sensors in an array—that is, a networked microphone array.

The microphone may include an omnidirectional microphone and a directional microphone (e.g., a shotgun microphone).

The client device 50, 70 may include a pre-processing module 51 capable of pre-processing a user input (speech signal) that is received through the input module (e.g., a microphone).

The pre-processing module 51 may include an adaptive echo canceller (AEC) function to thereby remove echo included in a user speech signal received through the microphone. The pre-processing module 51 may include a noise suppression (NS) function to thereby remove background noise included in a user input. The pre-processing module 51 may include an end-point detect (EPD) function to thereby detect an end point of a user speech and thus find out where the user speech exists. In addition, the pre-processing module 51 may include an automatic gain control (AGC) function to thereby control volume of the user speech in such a way suitable for recognizing and processing the user speech.

The client device 50, 70 may include a voice activation module 52. The voice activation module 52 may recognize a wake-up call indicative of recognition of a user's call. The voice activation module 52 may detect a predetermined keyword (e.g., Hi LG) from a user input which has been pre-processed. The voice activation module 52 may remain in a standby state to perform an always-on keyword detection function.

The client device 50 may transmit a user voice input to a cloud server. ASR and natural language understanding (NLU) operations, which are essential to process a user speech, is generally performed in Cloud due to computing, storage, power limitations, and the like. The Cloud may include the cloud device 6 that processes a user input transmitted from a client. The cloud device 6 may exists as a server.

The cloud device 6 may include an auto speech recognition (ASR) module 61, an artificial intelligent agent 62, a natural language understanding (NLU) module 63, a text-to-speech (TTS) module 64, and a service manager 65.

The ASR module 61 may convert a user input, received from the client device 50, into textual data.

The ASR module 61 includes a front-end speech pre-processor. The front-end speech pre-processor extracts a representative feature from a speech input. For example, the front-perform a Fourier transform on the speech input to extract spectral features that characterize the speech input as a sequence of representative multi-dimensional vectors. In addition, The ASR module 61 may include one or more speech recognition modules (e.g., an acoustic model and/or a language module) and may realize one or more speech recognition engines.

Examples of the speech recognition model include Hidden Markov Models, Gaussian-Mixture Models, Deep Neural Network Models, n-gram language models, and other statistical models. Examples of the speech recognition model include a dynamic time warping (DTW)-based engine and a weighted finite state transducer (WFST)-based engine. The one or more speech recognition models and the one or more speech recognition engines can be used to process the extracted representative features of the front-end speech pre-processor to produce intermediate recognitions results (e.g., phonemes, phonemic strings, and sub-words), and ultimately, text recognition results (e.g., words, word strings, or sequence of tokens).

Once the ASR module 61 generates a recognition result including a text string (e.g., words, or sequence of words, or sequence of tokens), the recognition result is transmitted to the NLP module 732 for intention deduction. In some examples, The ASR module 730 generates multiple candidate text expressions for a speech input. Each candidate text expression is a sequence of works or tokens corresponding to the speech input.

The NLU module 63 may perform a syntactic analysis or a semantic analysis to determine intent of a user. The syntactic analysis may be used to divide a user input into syntactic units (e.g., words, phrases, morphemes, or the like) and determine whether each divided unit has any syntactic element. The semantic analysis may be performed using semantic matching, rule matching, formula matching, or the like. Thus, the NLU module 63 may obtain a domain, intent, or a parameter (or a slot) necessary to express the intent from a user input through the above-mentioned analysis.

According to an embodiment, the NLU module 63 may further include a natural language generating module (not shown). The natural language generating module may change specified information to a text form. The information changed to the text form may be a natural language speech. For example, the specified information may be information about an additional input, information for guiding the completion of an action corresponding to the user input, or information for guiding the additional input of the user. The information changed to the text form may be displayed in a display after being transmitted to the client device or may be changed to a voice form after being transmitted to the TTS module.

The TTS module 64 may convert text input to voice output. The TTS module 64 may receive text input from the NLU module 63 of the LNU module 63, may change the text input to information in a voice form, and may transmit the information in the voice form to the client device 50. The client device 50 may output the information in the voice form via the speaker.

Meanwhile, according to an embodiment, the client environment may further include an Artificial Intelligence (AI) agent 62. The AI agent 62 is defined to perform at least some of the above-described functions performed by the ASR module 61, the NLU module 62 and/or the TTS module 64. In addition, the AI module 62 may make contribution so that the ASR module 61, the NLU module 62 and/or the TTS module 64 perform independent functions, respectively.

The AI agent module 62 may perform the above-described functions through deep learning. The deep learning represents a certain data in a form readable by a computer (e.g., when the data is an image, pixel information is represented as column vectors or the like), and efforts are being made to conduct enormous researches for applying the representation to learning (which is about how to create better representation techniques and how to create a model that learns the better representation techniques), and, as a result, various deep learning techniques such as deep neural networks (DNN), convolutional deep neural networks (CNN), Recurrent Boltzmann Machine (RNN), Restricted Boltzmann Machine (RBM), deep belief networks (DBN), and Deep Q-Network, may be applied to computer vision, speech recognition, natural language processing, speech/signal processing, and the like. Currently, all commercial speech recognition systems (Microsoft's Cortana, Skype translator, Google Now, Apple Siri, etc.). are based on deep learning techniques.

In particular, the AI agent module 62 may perform various natural language processes, including machine translation, emotion analysis, and information retrieval, to process natural language by use of a deep artificial neural network architecture.

In particular, the AI agent module 62 according to the present disclosure, in order to recognize a user's voice in a situation where noise is included, target data representing a feature from a database and non-target data representing a non-characteristic. In-depth neural network structures can be used to acquire and learn data.

[1] Meanwhile, the cloud server 6 may include a service manager 65 capable of supporting the AI agent module 62 by collecting various personalized information.

The personalized information acquired through the service manager may include at least one data (a calendar application, a messaging service, usage of a music application, etc.) used through the cloud environment, at least one sensing data (a camera, a microphone, temperature, humidity, a gyro sensor, C-V2X, a pulse, ambient light, Iris scan, etc.) collected by the client device 50 and/or the cloud 60, off device data directly not related to the client device 50. For example, the personalized information may include maps, SMS, news, music, stock, weather, Wikipedia information.

When compared to the client device 50 and cloud server 6 mentioned with respect to FIG. 5, the cloud device 70 and cloud server 8 shown in FIG. 7 may correspond to the client device 50 and cloud server 6 of FIG. 5, except for the differences in some components and functions. For detailed functions of the corresponding blocks, refer to FIG. 5.

Moreover, the cloud server 8 may include cloud knowledge 80 that stores personalized information in the form of knowledge.

A function of each module shown in FIG. 7 may refer to FIG. 5. However, since the ASR module 73, the NLU module 75, and the TTS module 76 are included in the client device 70, communication with Cloud may not be necessary for a speech processing procedure such as speech recognition, speech synthesis, and the like, and thus, an instant real-time speech processing operation is possible.

Each module shown in FIGS. 6 and 7 are merely an example for explaining a speech processing procedure, and modules more or less than in FIGS. 6 and 7 may be included. In addition, two or more modules may be combined or different modules or modules with different arrangement structures may be included. The various modules shown in FIGS. 6 and 7 may be implemented in hardware, software instructions for execution by one or more processors, firmware, including one or more signal processing and/or application specific integrated circuits, or a combination thereof.

Figure 8:
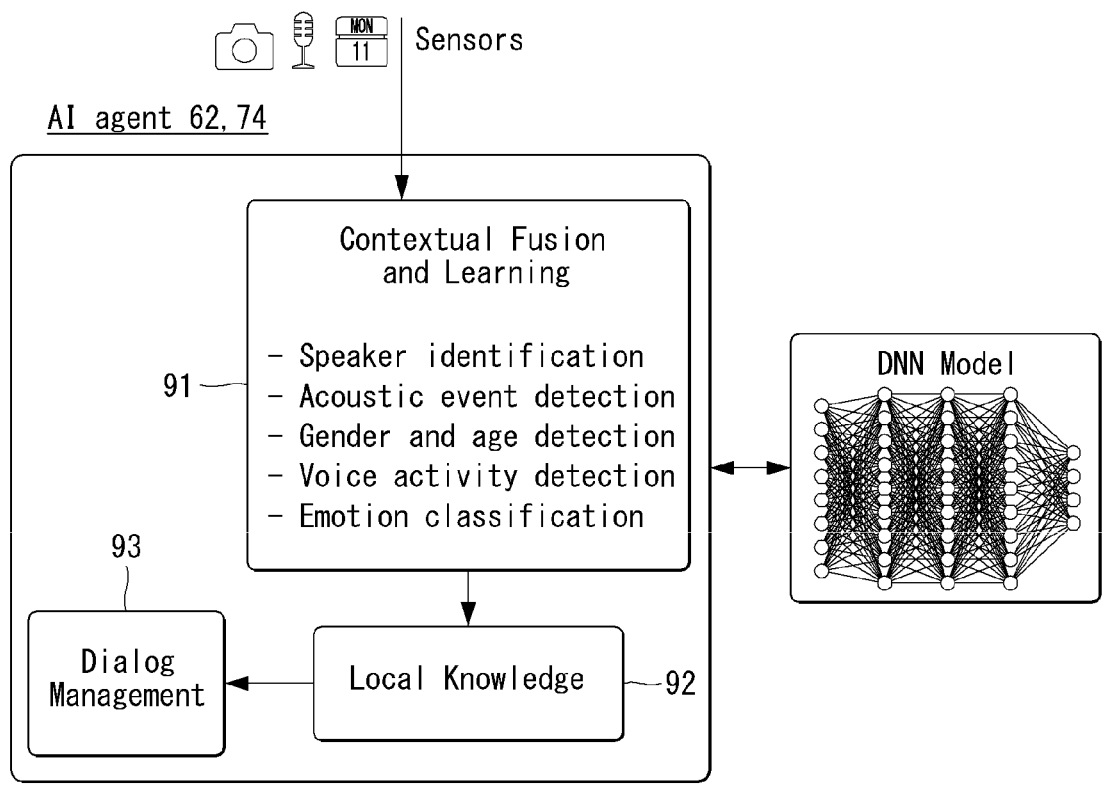
FIG. 8 is a schematic block diagram of an intelligent agent capable of implementing speech information based speech synthesis in accordance with an embodiment of the present disclosure.

FIG. 8 is a block diagram showing a schematic configuration of the intelligent agent modules 62 and 74 according to the present disclosure shown in FIGS. 6 and 7.

Referring to FIG. 8, in the speech processing procedure described with reference to FIGS. 5 and 6, the AI agent module 62, 74 may support an interactive operation with a user, in addition to an ASR operation, an NLU operation, and a TTS operation. Alternatively, using context information, the AI agent module 62, 74 may make contribution so that the NLU module 63, 75 further clarify, complements, or additionally define information included in text expressions received from the ASR module 61,73.

Here, the context information may include preference of a user of a client device, hardware and/or software states of the client device, various types of sensor information received before, during, or after a user input, previous interactions (e.g., dialogue) between the AI agent and the user, etc. In the present disclosure, the context information is dynamic and varies depending on time, location, contents of the dialogue, and other elements.

The AI agent module 62, 74 may further include a context fusion and learning module 91, a local knowledge 92, and a dialogue management 93 as shown FIG. 7.

The context fusion and learning module 91 may learn a user's intent based on at least one data. The at least one data may further include at least one sensing data acquired by a client device or a cloud environment. In addition, the at least one data may further include speaker identification, acoustic event detection, a speaker's personal information (gender and age detection), voice activity detection (VAD), and emotion classification information.

The speaker identification may indicate specifying a speaker in a speaker group registered by a speech. The speaker identification may include identifying a pre-registered speaker or registering a new speaker. The acoustic event detection may outdo a speech recognition technique and may be used to recognize acoustics itself to recognize a type of sound and a place where the sound occurs. The VAD is a speech processing technique of detecting presence or absence of a human speech (voice) from an audio signal that can include music, noise, or any other sound. According to an embodiment, the AI agent 74 may detect presence of a speech from the input audio signal. According to an embodiment the AI agent 74 differentiates a speech data and a non-speech data using a deep neural networks (DNN) model. In addition, the AI agent 74 may perform emotion classification information on the speech data using the DNN model. According to the emotion classification information, the speech data may be classified as anger, boredom, fear, happiness, or sadness.

The contest fusion and learning module 91 may include a DNN model to perform the above-described operation, and may determine intent of a user input based on sensing information collected in the DNN model, the client device or the cloud environment.

The at least one data is merely an example and may include any data that can be referred to so as to determine intent of a user in a speech processing procedure. The at least one data may be acquired through the above-described DNN model.

The AI agent 62, 74 may include the local knowledge 92. The local knowledge 92 may include user data. The user data may include a user's preference, the user's address, the user's initially set language, the user's contact list, etc. According to an embodiment, the AI agent 62, 74 may additionally define the user's intent by complementing information included in the user's speech input using the user's specific information. For example, in response to the user's request "Invite my friends to my birthday party", the AI agent 62, 74 does not request more clarified information from the user and may utilize the local knowledge 92 to determine who "the friends" are and when and where the "birthday" takes place.

The AI agent 62, 74 may further include the dialogue management 93. The AI agent 74 may provide a dialogue interface to enable speech conversation with the user. The dialogue interface may refer to a procedure of outputting a response to the user's speech input through a display or a speaker. Here, a final result output through the dialogue interface may be based on the ASR operation, the NLU operation, and the TTS operation, which are described above.

Figure 9:
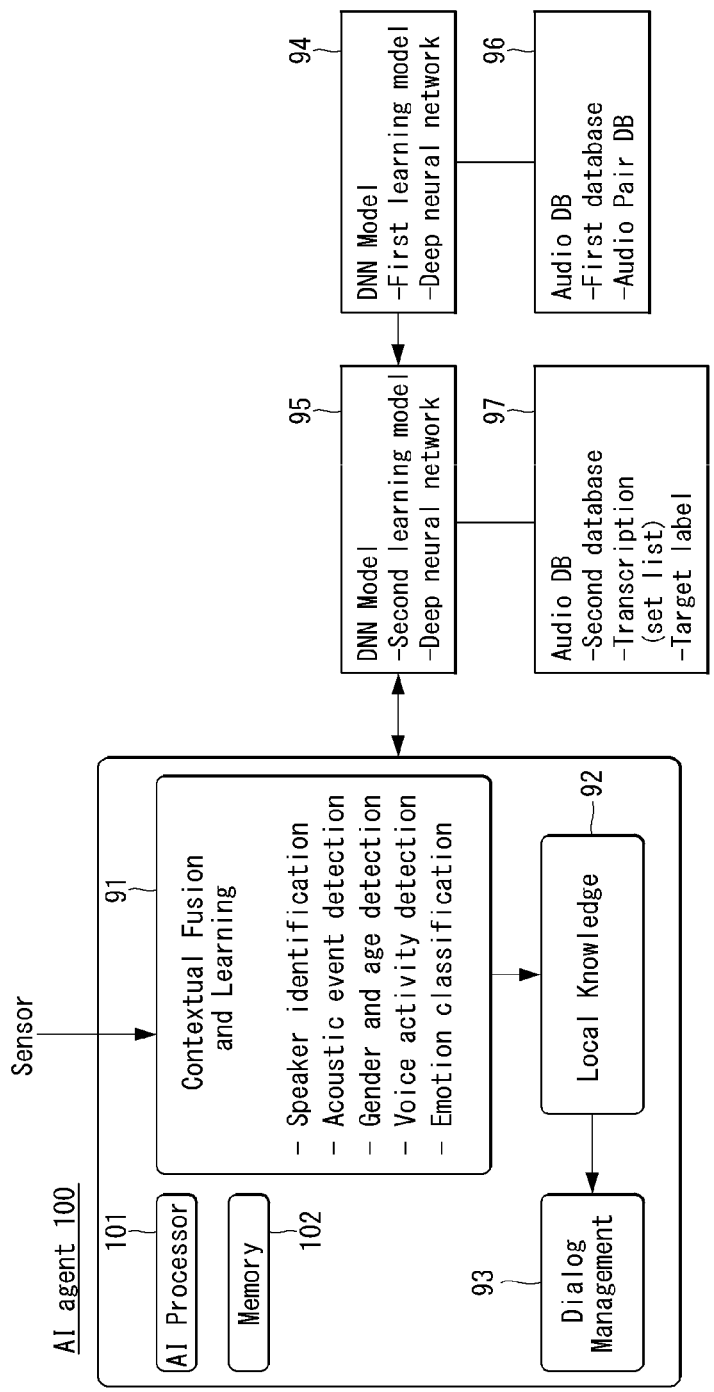
FIG. 9 is a detailed block diagram of an AI agent module according to an exemplary embodiment of the present disclosure.

Hereinafter, with reference to FIG. 9, in order to clearly recognize a user's voice even in a noise-containing situation, target data representing a feature included in the user's voice and non-target data representing a non-characteristic. The configuration of the intelligent agent module of the present disclosure that can learn data) will be described in more detail. FIG. 9 is a block diagram of the intelligent agent module 100, that is, the AI agent module 100, according to an embodiment of the present disclosure, and more specifically, the artificial agent module 62, 74 shown in FIGS. 6 and 7. One AI agent module 100.

In the specification below, a description will be given on the assumption that the terms AI agent module and AI device refer to the AI agent module 100 shown in FIG. 9 or are at least an AI device including the AI agent module 100 shown in FIG. 8.

The AI agent module 100 shown in FIG. 9 may perform tasks, such as processing, determining, and creating a control signal, by performing AI processing of speech sensing data sensed by the speech recognition device 10. Also, the AI agent module 100 shown in FIG. 9 may further include an AI processor 101 for AI processing, and the AI agent module 100 may recognize utterance information (e.g., information related to a time when a user utters, information related to the user who is identified as having uttered, location information of the speech recognition device, and utterance position information) by using the AI processor 101, and may itself learn through an artificial neural network for extracting the signal characteristics of the recognized speech.

The artificial neural network may be designed to emulate a human brain's structure on the AI agent module 100, and may include a plurality of network nodes having weights that emulate neurons in a human neural network. The plurality of network nodes may send and receive data through connections so that they emulate the synaptic activity of neurons sending and receiving signals through synapses. Such a neural network may include a deep learning model, which evolved from a neural network model. In the deep learning model, the plurality of network nodes are arranged in different layers, and may send and receive data through convolutions. Examples of the neural network model include various deep learning techniques such as deep neural networks (DNN), convolutional deep neural networks (CNN), recurrent neural networks (RNN), restricted Boltzmann machines (RBM), deep belief networks (DBN), and deep Q-networks, and are applicable to fields including computer vision, speech recognition, natural language processing, and speech/signal processing.

Meanwhile, the AI processor 101 that performs the above-described functions may be a general-purpose processor (e.g., CPU) or an AI-dedicated processor (e.g., GPU) for artificial intelligence learning.

The AI agent module 100 may include a memory 102. The memory 102 may store various programs and data required for the operation of the AI agent module 100. The memory 102 may be implemented as non-volatile memory, volatile memory, flash memory, hard disk drive (HDD), or solid state drive (SSD). The memory 102 is accessed by the AI processor 101, and the AI processor 101 may read, write, modify, delete, or update data. Also, according to the exemplary embodiment of the memory 102 may store a neural network model (e.g., deep learning model) created by an algorithm for learning target data representing features of the user's speech and non-target data representing non-features thereof.

On the other hand, the AI processor 101 may store the trained neural network model in a memory of a server that is connected to the AI agent module 100 and a device including the same over a wired or wireless network.

The AI agent module 100 with these functions according to the exemplary embodiment of the present disclosure may learn a pair of speech data sets with different noise data through a neural network-based speech recognition model and also may learn itself to recognize exactly the user's utterance under various noise situations.

This is because the speech recognized by each speech recognition device 10, 20, 30, and 40 contains different noise data because each speech recognition device 10, 20, 30, and 40 is in a different device state (e.g., microphone's position) or each speech recognition device 10, 20, 30, and 40 uses a different recognition method (e.g., recognition algorithm). That is, even when different speech recognition devices 10, 20, 30, and 40 located the same distance from the speech utterance position receive speech having the same meaning and content, the speech signal and speech data obtained by each speech recognition device 10, 20, 30, and 40 may be different.

Accordingly, although the AI agent module 100 according to the exemplary embodiment of the present disclosure may retrieve first and second speech data sets from a database and learn them, each composed of an utterance or speech with the same meaning and phonemes and having different noise values, and may distinguish between the user's utterance recognized by the speech data collector 54 included in the speech recognition device 10, 20, 30, and 40 and the noise around the speech recognition device.

The AI agent module 100 according to the exemplary embodiment of the present disclosure may use a deep neural network-based first learning model 94 as a preliminary learning model and a deep neural network-based second learning model 95 for extracting the signal characteristics of the speech recognized by the speech data collector 54, in order to learn the first and second speech data sets having different noise values.

Particularly, the AI agent module 100 according to the exemplary embodiment of the present disclosure randomly determines the noise value contained in each speech data set, in order to make the noise values contained in the first and second speech data sets different.

Accordingly, the AI agent module 100 according to the exemplary embodiment of the present disclosure may distinguish the user's utterance or speech clearly from any noise that may be contained in the user's utterance or speech, as long as the user's utterance or speech has the same meaning and phonemes.

Hereinafter, a process for the AI agent module 100 according to the exemplary embodiment of the present disclosure to learn target data representing features of a user's speech and non-target data representing non-features thereof will be described in more specific details with reference to FIGS. 10 to 14.

Figure 10:
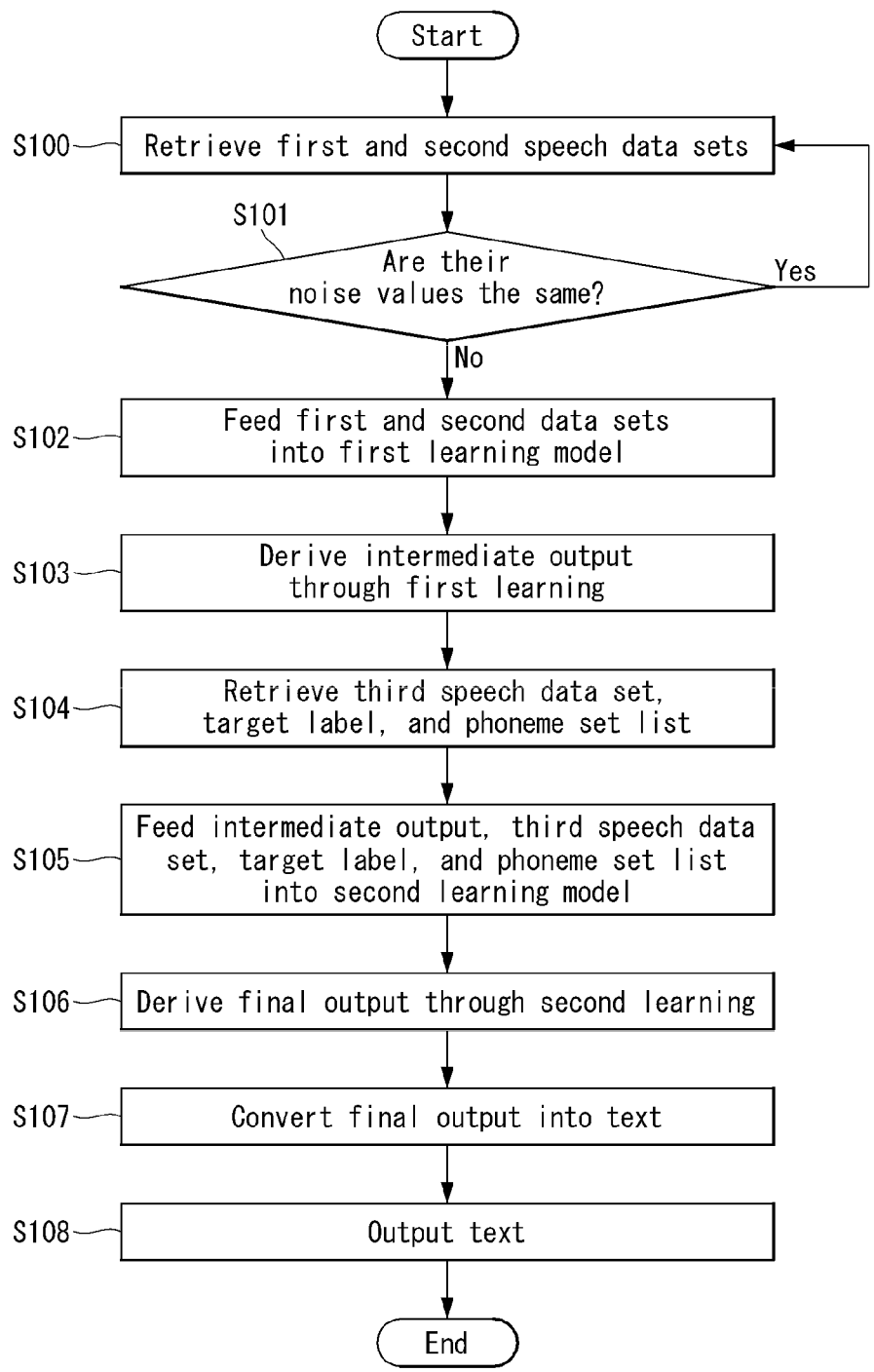
FIG. 10 is a flowchart showing a process for the AI agent module to learn target data and non-target data according to the exemplary embodiment of the present disclosure.

FIG. 10 is a flowchart showing a process for the AI agent module 100 to learn target data and non-target data according to the exemplary embodiment of the present disclosure.

First of all, the AI processor 101 according to the exemplary embodiment of the present disclosure retrieves a pair of first and second speech data sets from a first data base 96 (S100).

In this case, the first database may be a separate database that exits in the cloud server 6 or be connected over a network 5. Contrariwise, the first database may be a database that exists in an AI device or speech recognition device including the AI agent module 100.

The AI processor 101 may check whether the respective noise values contained in the first and second speech data sets are different or not (S101).

Data constituting each noise value includes information on the speaker, type of speech recognition device, distance between the speech recognition device and the speaker, echo, and sounds coming from around the speech recognition device. Such information involves non-features which are not related to the meaning of the user's utterance or speech, which are classified as non-target data.

If the respective noise values contained in the first and second speech data sets are the same, the AI processor 101 retrieves another pair of speech data sets from the first database 96, which have different noise values but have the same meaning and phonemes. Also, if the respective noise values contained in the first and second speech data sets are the same, the AI processor 101 may arbitrarily modify the noise values to make them different from each other.

If the respective noise values contained in the first and second speech data sets retrieved from the first database 96 are different, the AI processor 101 feeds the first and second data sets as input and output respectively into a first learning model (S102), and derives an intermediate output through first learning of the first and second data sets using the first learning model 94 (S103).

The first learning model 94 may be configured as any of the above-mentioned artificial neural networks.

Meanwhile, the AI processor 101 retrieve a third speech data set, a target label containing alphabetical information about the third speech data set, and a phoneme set list from a second database 97 (S104). In this case, the second database 97 may be the same as or different from the above-mentioned first database 96. However, it is preferable to configure the first and second databases differently, in order to increase the reliability of the speech recognition model of the AI agent module 100.

The third speech data set does not need to have the same meaning or phonemes as the pair of first and second data sets, and may have a meaning or phonemes different than those of the first and second data sets. Because the intermediate output derived through learning of the first and second data sets using the first learning model is an output for the user's utterance from which most of the noise is removed, the AI agent module 100 may learn to recognize exactly the content of the user's utterance by learning the third speech data set and the intermediate output.

The AI processor 101 feeds the third speech data, target label, phoneme set list, and intermediate output as input and output into a second learning model 95 (S105), and derives a final output through second learning of the third speech data set, target label, phoneme set list, and intermediate output (S106).

FIG. 12 is a table showing how first and second data sets having different noise values are constructed. Referring to FIG. 12, the AI processor 101 may construct the first and second speech data sets constituting 'pair 1' in such a way as to have random noise values as follows.

First of all, for the noise value for the first speech data set used as input, the AI processor 101 may set the type (product) of speech recognition device used as "microphone installed in a studio", set the echo and noise as "none", set the distance between the speech recognition device and the speaker as "distance shorter than 1 m", and set the speaker as "user A". Meanwhile, for the noise value for the second speech data set, the AI processor 101 may set the type (product) of speech recognition device used as "microphone installed on a refrigerator", set the echo as "0.5", set the noise as "none", set the distance between the speech recognition device and the speaker as "3 m", and set the speaker as "user A", in order to make the second speech data set used as output have a different noise value than that for the first speech data set.

In this case, even though the first and second speech data sets contain the same noise data for the speaker, the AI processor 101 may distinguish an utterance "Hello" from noise by learning the pair 1, because they have different types (products) of speech recognition device used for speech recognition, different echoes, and different data for the distance between the speech recognition device and the speaker.

Moreover, the AI processor 101 may construct the first and second speech data sets constituting 'pair 2' in such a way as to have random noise values as follows.

For the noise value for the first speech data set used as input, the AI processor 101 may set the type (product) of speech recognition device used as "microphone installed on an air conditioner running", set the echo to "0.7", set the noise as "sound coming from a TV appliance", set the distance between the speech recognition device and the speaker as "3 m", and set the speaker as "user B". Meanwhile, for the noise value for the second speech data set used as output, the AI processor 101 may set the type (product) of speech recognition device used as "microphone installed on a washing machine", set the echo as "0.3", set the noise as "sound coming from a street", set the distance between the speech recognition device and the speaker as "1 m", and set the speaker as "user C".

In this case, the AI processor 101 may distinguish an utterance "Hello" from noise by learning the pair 2, because the first and second data sets contain different noise data.

In this way, the AI processor 101 may construct the first and second speech data sets in such a way as to have random noise values, so that they have different noise values.

Meanwhile, the AI processor 101 converts the final output derived through the second learning into text by using a natural language creation module included in an NLU module 63 and 75 (S107), and outputs it through an output medium such as a display included in a dialogue interface (S108).

Figure 11:
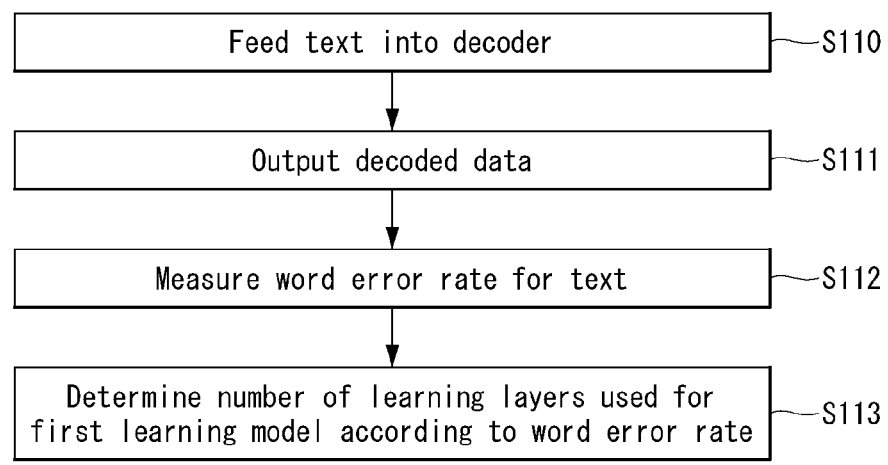
FIG. 11 is a flowchart showing a process of measuring the word error rate for text output produced as a result of the AI agent module's learning according to the exemplary embodiment of the present disclosure.

Referring to FIG. 11, a process of evaluating learning results of the AI agent module 100 will be described below. FIG. 11 is a flowchart showing a process of measuring the word error rate for text output produced as a result of the AI agent module's learning according to the exemplary embodiment of the present disclosure.

First of all, the AI processor 101 feeds the text, generated by converting the final output derived through the second learning, into a decoder (S110). The decoder converts the text back into data to output decoded data (S111). The AI processor 101 measures the word error rate for the data output (S112), and, if the word error rate is higher than a specified value, the number of learning layers used for the first learning model is increased (S113). On the other hand, if the measured word error rate is equal to or lower than the specified value, the number of learning layers used for the first learning model remains the same (S113).

Meanwhile, the AI agent module 100 according to the present disclosure distinguishes the user's utterance and noise from a speech newly recognized by the speech recognition device 50 and 70, on the basis of such learning results.

Figure 13:
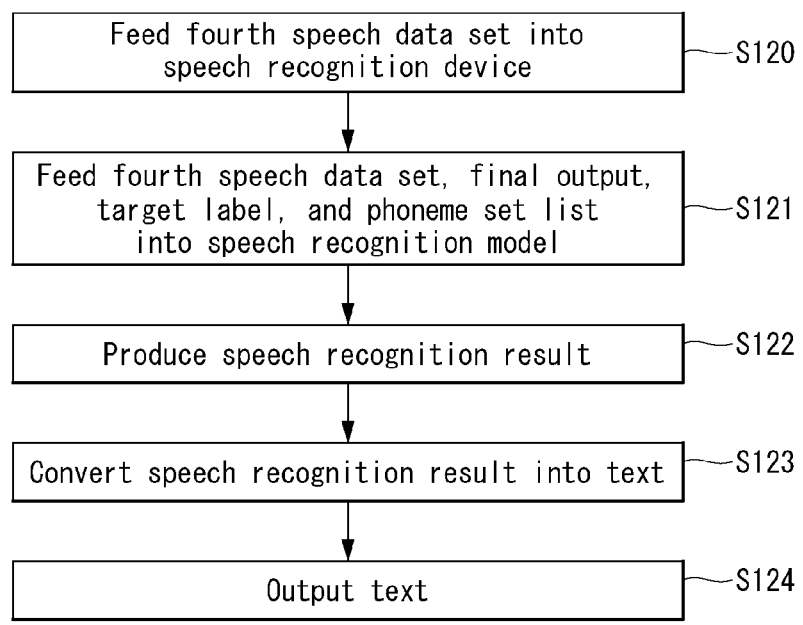
FIG. 13 is a flowchart showing a process for the AI agent module to learn a newly recognized speech according to the present disclosure.

FIG. 13 is a flowchart showing a process for the AI agent module 100 to learn a newly recognized speech according to the present disclosure. Referring to FIG. 13, when a fourth speech data set is created from a new speech recognized by the speech recognition device 50 and 70 (S120), the AI agent module 100 may feed the fourth speech data set as input and the final output derived through the second learning and the retrieved target label and phenome set list as output into a speech recognition model (S121), and may produce a speech recognition result through third learning of the final output, fourth speech data set, target label, and phoneme set list (S122).

The produced speech recognition result may be then converted into text by using a natural language creation module (S123), and outputted through an output medium such as a display included in a dialogue interface (S124).

Moreover, the AI agent module 100 according to the present disclosure may allow the speech recognition device that has recognized the speech to execute a function corresponding to the speech, based on the speech recognition result.

Figure 14:
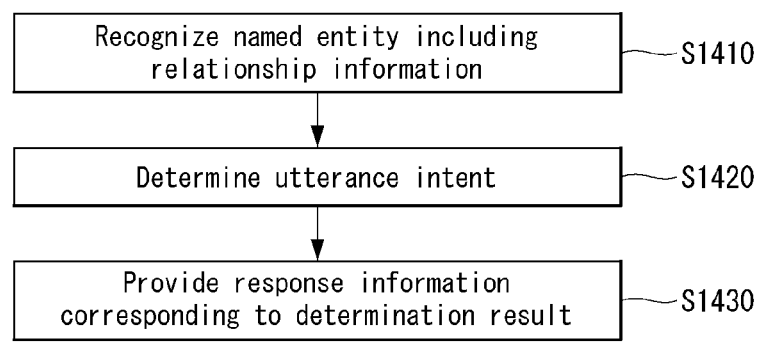
FIG. 14 is a flowchart showing a process in which the AI agent module allows a speech recognition device to execute a function using a final recognized speech according to the present disclosure.

FIG. 14 is a flowchart showing a process in which the AI agent module 100 allows a speech recognition device to execute a function using a final recognized speech according to the present disclosure. Referring to FIG. 14, the AI agent module 100 obtains information related to a text recognition situation through the speech recognition device 50 or 70 (S130), applies the information related to the text recognition situation to a trained threshold situation determination and classification model (S131), and determines whether the speech recognition device 50 and 70 has recognized the text in a threshold situation or not (S132).

If it is determined that the speech recognition device 50 and 70 has recognized the text in a threshold situation (S133), the speech recognition device 50 and 70 is controlled to execute a function corresponding to the text (S134).

The information related to the text recognition situation may include the text recognition time, information about the user who is identified as having uttered the text, location information of the speech recognition device, surrounding acoustic information of the speech recognition device, and the position where the text is uttered. In particular, the surrounding acoustic information may refer to information about sounds other than the speech uttered by the user.

Meanwhile, the threshold situation determination and classification model may be separate from the AI agent module 100. Also, if the threshold situation determination and classification model is stored in an external AI (artificial intelligence) device, the AI agent module 100 may transmit, to the external AI device, feature values for the information related to the text recognition situation. Once the information related to the text recognition situation is fed into the external AI device, the AI agent module 100 may obtain, from the external AI device, a result of applying the information related to the text recognition situation to the threshold situation determination and classification model.

Moreover, the threshold situation determination and classification model may be stored in a network. In this case, the AI agent module 100 may transmit the information related to the text recognition situation to the network, and obtain, from the network, a result of applying the information related to the text recognition situation to the threshold situation determination and classification model. When the AI agent module 100 transmits information to the network, the AI agent module 100 first receives, from the network, DCI (downlink control information) used to schedule the transmission of the information related to the text recognition situation, and the information related to the text recognition situation is transmitted to the network based on the DCI.

In addition, when receiving the DCI from the network, the AI agent module 100 performs an initial access procedure with the network based on an SSB (synchronization signal block), and the information related to the text recognition information is transmitted to the network via a PUSCH. In this case, the SSB and the DM-RS of the PUSCH are quasi co-located with QCL type D.

As seen from above, in a method for training an artificial neural network-based speech recognition model and a speech recognition device according to the present disclosure, a user's speech is learned by using target data representing features and non-target data representing non-features as random inputs and outputs, and then the user's speech is recognized under a noise situation. Thus, it is possible to provide a speech recognition model and speech recognition device that are capable of recognizing exactly a user's speech even with noise.

The above-described present disclosure can be implemented with computer-readable code in a computer-readable medium in which program has been recorded. The computer-readable medium may include all kinds of recording devices capable of storing data readable by a computer system. Examples of the computer-readable medium may include a hard disk drive (HDD), a solid state disk (SSD), a silicon disk drive (SDD), a ROM, a RAM, a CD-ROM, magnetic tapes, floppy disks, optical data storage devices, and the like and also include such a carrier-wave type implementation (for example, transmission over the Internet). Therefore, the above embodiments are to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method for training an artificial neural network-based speech recognition model, the method comprising:
retrieving first and second speech data sets from a first database;
feeding the first and second speech data sets as input and output, respectively, into a first learning model;
deriving an intermediate output through first learning of the first and second data sets using the first learning model;
retrieving a third speech data set, a target label containing alphabetical information about the third speech data set, and a phoneme set list from a second database;
feeding the intermediate output, third speech data, target label, and phoneme set list as input and output into a second learning model; and
deriving a final output through second learning of the intermediate output, third speech data set, target label, and phoneme set list using the second learning model,
wherein the first and second speech data sets are each composed of an utterance having the same meaning and phonemes and have different noise values.

2. The method of claim 1, wherein data constituting each noise value comprises non-target data representing information on the speaker, type of speech recognition device, distance between the speech recognition device and the speaker, echo, and sounds coming from around the speech recognition device,
wherein values constituting the non-target data are randomly determined.

3. The method of claim 1, further comprising:
converting the final output into text; and
outputting the text.

4. The method of claim 3, further comprising:
feeding the text into a decoder;
deriving data decoded by the decoder; and
measuring word error rate by evaluating the decoded data.

5. The method of claim 4, further comprising determining the number of learning layers used for the first learning model according to the word error rate for the text derived in the measuring of word error rate.

6. The method of claim 1, further comprising:
feeding a fourth data set into a speech recognition device; and
feeding the fourth speech data set as input and the final output, target label, and phenome set list as output into a speech recognition model.

7. The method of claim 6, further comprising:
converting a speech recognition result into text, the speech recognition result being produced through learning of the fourth speech data set, final output, target label, and phoneme set list using the speech recognition model; and
outputting the text.

8. The method of claim 7, further comprising:
obtaining information related to a text recognition situation through the speech recognition device, the information being derived in the conversion of a speech recognition result into text;
applying the information related to the text recognition situation to a trained threshold situation determination and classification model; and
determining whether the speech recognition device has recognized the text in a threshold situation or not, based on a result of applying the information related to the text recognition situation to the threshold situation determination and classification model.

9. The method of claim 8, further comprising, when the speech recognition device has recognized the text in a threshold situation, controlling the speech recognition device to execute a function corresponding to the text.

10. The method of claim 8, wherein the information related to the text recognition situation comprises the text recognition time, information about the user who is identified as having uttered the text, location information of the speech recognition device, surrounding acoustic information of the speech recognition device, and the position where the text is uttered,
wherein the surrounding acoustic information is information about sounds other than the speech uttered by the user.

11. The method of claim 8, further comprising,
when the threshold situation determination and classification model is stored in an external AI (artificial intelligence) device, transmitting, to the external AI device, feature values for the information related to the text recognition situation;
feeding the information related to the text recognition situation into the external AI device; and
obtaining, from the external AI device, a result of applying the information related to the text recognition situation to the threshold situation determination and classification model.

12. The method of claim 8, further comprising,
when the threshold situation determination and classification model is stored in a network, transmitting the information related to the text recognition situation to the network; and
obtaining, from the network, a result of applying the information related to the text recognition situation to the threshold situation determination and classification model.

13. The method of claim 12, wherein the transmitting of the information related to the text recognition situation to the network comprises receiving, from the network, DCI (downlink control information) used to schedule the transmission of the information related to the text recognition situation,
wherein the information related to the text recognition situation is transmitted to the network based on the DCI.

14. The method of claim 13, wherein the receiving of DCI used to schedule the transmission of the information related to the text recognition situation from the network comprises performing an initial access procedure with the network based on an SSB (synchronization signal block),
wherein the information related to the text recognition information is transmitted to the network via a PUSCH, and the SSB and the DM-RS of the PUSCH are quasi co-located with QCL type D.

15. A speech recognition device for training an artificial neural network-based speech recognition model, the speech recognition device comprising:
a speech data collector that collects speech data including the user's utterance information and acoustic data from the surroundings of the speech recognition device;
an AI processor that learns the speech and acoustic data collected by the speech data collector, extracts the speech data, and converts the speech data into text; and
a transceiver that communicates with a network,
wherein the AI processor retrieves first and second speech data sets from a first database and retrieves a third speech data set, a target label containing alphabetical information about the third speech data set, and a phoneme set list from a second database, performs first learning through a first learning model by using the first and second speech data sets as input and output, respectively, performs second learning through a second learning model by using an intermediate output derived through the first learning, the third speech data set, the target label, and the phoneme set list as input and output, and converts a final output derived through the second learning into text and outputs the same,
wherein the first and second data sets are each composed of an utterance having the same meaning and phonemes and have different noise values.

16. The speech recognition device of claim 15, wherein data constituting each noise value comprises non-target data representing information on the speaker, type of speech recognition device, distance between the speech recognition device and the speaker, echo, and sounds coming from around the speech recognition device,
wherein values constituting the non-target data are randomly determined.

* * * * *